March 6, 1962 G. A. LYON 3,023,857
WHEEL STRUCTURE
Filed Sept. 2, 1958
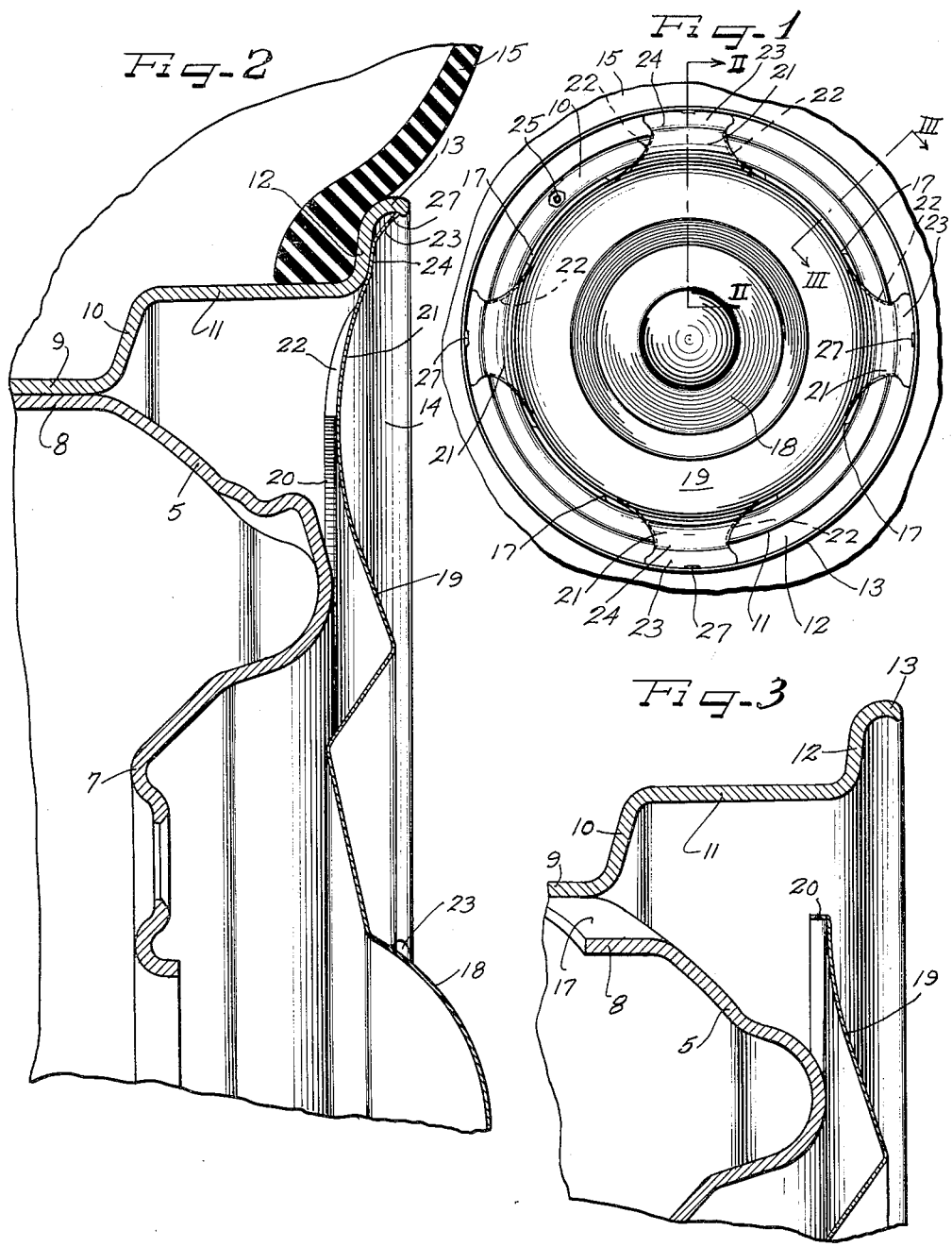
Inventor
George Albert Lyon

United States Patent Office 3,023,857
Patented Mar. 6, 1962

3,023,857
WHEEL STRUCTURE
George Albert Lyon, Detroit, Mich., assignor to Lyon Incorporated, Detroit, Mich., a corporation of Delaware
Filed Sept. 2, 1958, Ser. No. 758,276
9 Claims. (Cl. 188—264)

The present invention relates to improvements in wheel structures and more particularly concerns the ornamental and protective covering of the outer sides of vehicle wheels.

An important object of the present invention is to provide in a wheel structure an improved cover for press-on, pry-off disposition over the outer side of the wheel.

Another object of the invention is to provide an improved wheel structure having a grooved terminal flange, with a novel cover provided with retaining arms having terminals engageable in press-on, pry-off relation with the terminal flange.

A further object of the invention is to provide an economy wheel cover involving a minimum of material and minimum fabrication operations so that it can be produced and sold at low cost.

Still another object of the invention is to provide an improved wheel cover having novel retaining means for interengagement with a wheel part for retaining the cover on the outer side of the wheel.

Yet another object of the invention is to provide an improved wheel structure affording a novel assembly of a cover over the outer side of the wheel and enabling free air circulation through the wheel and the cover for cooling the wheel and a brake drum with which the wheel may be associated.

Other objects, features and advantages of the present invention will be readily apparent from the following detailed description of a preferred embodiment thereof taken in conjunction with the accompanying drawing, in which:

FIGURE 1 is an outer side elevational view of a vehicle wheel structure embodying features of the invention;

FIGURE 2 is an enlarged fragmentary radial sectional detail view taken substantially on the line II—II of Figure 1; and FIGURE 3 is a fragmentary radial sectional detail view taken substantially on the line III—III of Figure 1.

The present invention is especially adapted for a vehicle wheel and more particularly an automobile wheel having a disk spider wheel body 5 provided with the usual bolt-on central flange 7 by which the wheel is adapted to be attached to the customary axle flange immediately over a brake drum of the vehicle. At its outer margin the wheel body 5 has an axially extending attachment flange 8 by which the wheel body is attached to a base flange 9 of a drop center, multi-flange tire rim including a side flange 10 extending generally radially outwardly from the outer side of the base flange 9 and merging with a generally axially outwardly extending intermediate flange 11 from which extends a terminal flange including a generally radially outwardly extending portion 12 and a generally axially outwardly extending terminal lip portion 13 providing a generally radially inwardly facing groove 14. A pneumatic tire 15 of the tubeless type is adapted to be carried by the tire rim. At juncture of the wheel body 5 and the tire rim, the attachment flange 8 of the wheel body is provided at suitable intervals such as four equally circumferentially spaced with insets affording wheel openings 17 through which air is adapted to circulate for cooling the wheel and the brake drum with which the wheel is associated.

For ornamentally and protectively covering the outer side of the wheel, a wheel cover, as shown, is provided which is adapted to be made from thin sheet metal such as stainless steel, brass, aluminum alloy and the like sheet or strip efficiently and advantageously die pressed or drawn and suitably finished as by polishing and plating or otherwise. Herein, the cover is provided with a central crown portion 18 for overlying the bolt-on flange 7 in suitably spaced relation to house the axle parts which customarily project through the bolt-on flange of the wheel. About the central crown portion 18 is a marginal annular portion 19 which may be dished as shown and is of a diameter about as great as the diameter of the wheel body 5 so as to concealingly overlie the same in spaced relation. On its edge, the marginal cover portion 19 is provided with a turned preferably axially inwardly extending angular narrow reinforcing and finishing flange 20 which substantially stiffens the periphery of the cover.

For press-on, pry-off retention of the cover over the outer side of the wheel, the marginal portion 19 of the cover is provided at suitable circumferentially spaced intervals with cover retaining arm members 21 formed integrally in one piece with the cover body. Advantageously there are four of the retaining arms 21 of maximum width at juncture with the cover marginal portion 19 and extending as a continuation of the concavely dished radial contour of the dished portion 19.

In order to afford substantial resilient stiffness in the body portions of the retaining arms 21, the sides merge flaringly on preferably large concave radius with the convex radius of the edge of the cover marginal portion 19 intermediate the arms, and the reinforcing flange 20, interrupted by the arms 21, continues along each side of each of the arms 21 to provide respective side reinforcing flange extensions 22. Thereby the body portions of the retaining arms 21 are stiffly resiliently tied into the stiffly resiliently reinforced cover marginal portion 19 from which the arms project.

Means are provided on the retaining arms 21 for not only retaining interengagement with the wheel, but also support of the cover on the wheel. To this end, the retaining arms 21 project at their extremities to a diameter slightly greater than the inside diameter of the terminal flange lip portion 13 and more particularly the surface thereof defining the groove 14, with generally radially and axially outwardly extending cover retaining terminals 23 having thereon the rim flange engaging extremities. In the present instance, the tip edges of the retaining terminals 23 are directly engageable under resiliently tensioned generally radially outward thrust in biting engagement with the rim flange groove surface and more particularly behind the shoulder afforded by the axially outer side of the groove 14.

Between the retaining terminals 23 of the retaining arms 21 and the body portions of the arms, each of the arms is provided with an axially inwardly facing seating shoulder 24 generally complementary to and arranged to bottom against the terminal flange portion 12 for thereby supporting the cover in its axial assembled relation on the wheel. In a preferred form, the seating shoulder 21 is grooved circumferentially transversely in the arm 21, thus providing a slight hump on the outer face of the arm and a generally axially inwardly groove in the inner face of the arm, and affording with the terminal 23 a radially generally sinuous ogee curvature which is advantageous for enabling generally radial resilient flexing of the retaining terminals 23 during press-on and pry-off actions of the retaining arms. Such flexing is further enhanced by having the narrowest width of the arms across the seating shoulder portions 24 thereof and more particularly adjacent juncture of the shoulder portions with the body portions of the arms 21. Moreover, as best seen in FIGURE 2, the side reinforcing flanges 22 of the retaining arms terminate short of the terminal portions of the arms 21 and adjacent juncture of the seating shoulder portions 24 with the body portions of the arms so as not only to enhance resilient deflectability but also to enable seating of the shoulder portions 24 flush against the terminal flange portion 12. It will be observed that the flanges 22 at the sides of the arms 21 have the ends thereof merging with the respective sides of the arms whereby to afford wheel flange biting retaining ends on the terminal end portions of the arms.

For maximum cover retaining efficiency, the retaining terminals 23 of the retaining arms are preferably as wide as consistent with other structural relationships of the cover construction. To this end, the terminal portions 23 of the retaining arms are in a preferred form of generally hammer head shape in plane, a shown in FIGURE 1, projecting to maximum width toward each circumferential side of the arm, and thereby affording respective terminal edges of maximum length for engagement with the rim flange 13. Not only is this advantageous for retaining the cover against axially outward displacement, but also to retain the cover against turning on the wheel. Thereby the cover can be effectively disposed with the retaining arms 21 extending across juncture of the wheel body 5 and the tire rim between the wheel openings 17 so that the gaps between the retaining arms 21 substantially coincide with the wheel openings and thus afford free air circulation through the wheel openings and the gaps between the retaining arms 21. Also, proper orientation of the retaining arms 21 with respect to a valve stem 25 carried by the side flange 10 of the tire rim and projecting between two of the retaining arms is properly maintained for access to the valve stem.

In applying the cover to the outer side of the wheel, two of the retaining arms 21 are engaged at their terminal tips into the tire rim flange groove 14 and the remaining two arms then snapped into engagement with the rim flange 13 by camming the retaining terminal portions 23 of such arms over the tip of the terminal flange and responsive to axially inward pressure against the cover snapping such remaining arm terminals into engagement with the rim flange. In the fully seated assembled relation of the cover over the wheel, the seating shoulders 24 thrust in bottomed relation against the terminal flange portion 12 while the tips of the arm terminals 23 thrust retainingly, grippingly and generally bitingly against the opposed terminal flange portion 13. Since the cover body is supported in spaced relation to the wheel body 5, curbing or like axial pressure imposed on the cover body is readily absorbed by axially inward deflection of the cover body as permitted by resilient flexing of the retaining arms 21.

For removing the cover from the outer side of the wheel, a pry-off tool such as a screwdriver or the like is inserted behind the respective retaining arms 21 and more particularly behind the terminals 23, successively to pry the same free from the retaining engagement with the terminal flange portion 13. In order to facilitate this, at least two and preferably all of the retaining terminal portions 23 are provided centrally with a pry-off notch 27 of sufficient width to receive the tip of the pry-off tool so that the pry-off tool can be levered against the radially inner edge defined by the respective pry-off notch and fulcrumed against the adjacent tip of the terminal flange 13 for effectively resiliently radially inwardly deflecting the engaged arm terminal 23 out of engagement with the terminal flange. Upon releasing two of the arm terminals 23 in adjacent relation in either direction circumferentially of the cover, complete release of the cover is effected.

It will be understood that modifications and variations may be effected without departing from the scope of the novel concepts of the present invention.

I claim as my invention:

1. In a wheel structure including a wheel body and a tire rim having a terminal flange including a radially extending portion and a generally axially extending lip portion, a cover for disposition over the outer side of the wheel including a generally circular cover body for overlying the wheel body and of substantially smaller diameter than said terminal flange, said body having projecting radially from its perimeter a plurality of circumferentially spaced cover retaining arms each provided with a seating shoulder portion intermediate its length engageable against the radially extending terminal flange portion and a terminal extremity portion engageable under resilient tension in press-on, pry-off relation with the axially extending terminal flange lip portion, said seating and terminal portions being of generally sinuous cross-section radially, with the seating portion affording a generally axially inwardly facing groove and the terminal portion extending generally radially and axially outwardly therefrom and thereby enhancing resilient deflection of the terminal portions in press-on, pry-off action thereof.

2. In a wheel structure including a wheel body and a tire rim having a terminal flange including a radially extending portion and a generally axially extending lip portion, a cover for disposition over the outer side of the wheel including a generally circular cover body for overlying the wheel body and of substantially smaller diameter than said terminal flange, said body having projecting radially from its perimeter a plurality of circumferentially spaced cover retaining arms each provided with a seating shoulder portion intermediate its length engageable against the radially extending terminal flange portion and a terminal extremity portion engageable under resilient tension in press-on, pry-off relation with the axially extending terminal flange lip portion, said seating and terminal portions being of generally sinuous cross-section radially, with the seating portion affording a generally axially inwardly facing groove and the terminal portion extending generally radially and axially outwardly therefrom and thereby enhancing resilient deflection of the terminal portions in press-on, pry-off action thereof, said retaining arms having side reinforcing flanges in the portions thereof radially inwardly from said seating portions and terminating short of said seating portions whereby to enhance the stiffness of the retaining arms radially inwardly from the seating portions.

3. In a wheel structure including a wheel body and a tire rim, a cover for disposition over the outer side of the wheel including a generally circular cover body for overlying the wheel body and of substantially smaller diameter than at least a substantial portion of the tire rim, said cover body having projecting integrally in one piece from its edge generally radially outwardly circumferentially spaced cover retaining arms which are resiliently flexible in the axial direction of the cover and with terminal portions thereon engageable in press-on, pry-off relation with the tire rim, the cover body on its perimeter between the arms having axially inturned reinforcing flange with extensions of said flange on the sides of said retaining arms to enhance the resilient stiffness of the arms, said flange extensions terminating short of the terminal portions of the arms so that the terminal portions of the arms are of greater resilient deflectability to the remainder of each of the arms to facilitate press-on, pry-off interengagement with the tire rim.

4. A cover for disposition over the outer side of a vehicle wheel, the cover including a generally circular body having projecting at circumferentially spaced intervals from the perimeter thereof a plurality of cover retaining arms which are resiliently flexible in the axial direction of the cover and having terminal ends thereon for engagement with a wheel flange, said cover body having a peripheral turned reinforcing flange with extensions from said reinforcing flange onto the respective sides of the retaining arm extensions and affording substantial resilient stiffness in said arms, said reinforcing flange extensions terminating a limited distance from the terminal ends of the arms and said terminal ends providing retaining terminals which are substantially more resiliently deflectable than the remainder of the arms.

5. In a wheel structure including a wheel body and a tire rim supported by the wheel body and having a terminal flange, a thin sheet metal wheel cover for disposition over the outer side of the wheel including a body portion for overlying the wheel body and provided with a circumferentially spaced series of generally radially outwardly projecting cover retaining arms having terminals engageable in resiliently tensioned thrusting cover retaining engagement with the terminal flange, said arms being of maximum width at juncture with the cover body and tapering toward a narrowest dimension at juncture of the terminal portions with the body portions of the arms and said terminal portions being substantially wider than said narrowest dimension so as to provide maximum engaging contact with the terminal flange but said narrowest dimension affording enhanced resilient deflectability at said narrowest dimension for pry-off, snap-on movement of the terminal portions.

6. A cover for disposition over the outer side of a vehicle wheel, the cover including a body having a perimeter, a plurality of cover retaining arms projecting at circumferentially spaced intervals from said perimeter, said arms having terminal end portions for retaining engagement with a wheel flange, said cover retaining arms having on the sides thereof reinforcing flanges extending onto the cover body and affording substantial resilient stiffness in said arms and which reinforcing flanges terminate short of said terminal end portions, said flanges having ends thereof which merge with the respective sides of the arms adjacent said terminal end portions whereby to afford wheel flange biting retaining ends on said terminal end portions.

7. In a wheel structure including a wheel body and a tire rim having a terminal flange, a cover member for disposition over the outer side of the wheel including a cover body for overlying the wheel body and having a plurality of circumferentially spaced cover retaining arms of generally sinuous radial section projecting from the margin of the cover body and supporting the cover on the terminal flange and having short and stiff generally radially outwardly projecting terminals engaging retainingly with the terminal flange in press-on, pry-off relation, the cover having a circumferential edge axially inwardly extending reinforcing flange interrupted by said arms and with reinforcing extensions from said flange alongside the radially inner portions of the arms and terminating short of the radially outer portions and of the arms and substantially stiffening said radially inner portions of the arms.

8. In a wheel structure including a tire rim having an annular generally radially inwardly facing flange portion, a cover for disposition at the outer side of the wheel including a generally circular cover member having a marginal portion provided with generally radially outwardly projecting retaining fingers having resiliently flexible terminal end portions engageable in resilient tensioned retaining relation with said radially inwardly facing rim flange, said fingers having at the sides thereof turned reinforcing flanges for increasing the resilient stiffness of the fingers radially inwardly from said terminal end portions to enhance the tensioning and thereby the retaining engagement thereof with said rim flange, said reinforcing flanges terminating a substantial distance radially inwardly from the terminals of said terminal end portions so that said terminal end portions are of substantially greater flexibility than the remaining portions of the fingers, said fingers being of sinuous radial cross-section and with the terminals being short and stiff and directed generally outwardly for retaining engagement with the radially inwardly facing rim flange.

9. In a wheel structure including a tire rim having an annular generally radially inwardly facing flange portion, a cover for disposition at the outer side of the wheel including a generally circular cover member having a marginal portion provided with generally radially outwardly projecting retaining fingers having resiliently flexible terminal end portions engageable in resilient tensioned retaining relation with said radially inwardly facing rim flange, said fingers having at the sides thereof turned reinforcing flanges for increasing the resilient stiffness of the fingers radially inwardly from said terminal end portions to enhance the tensioning and thereby the retaining engagement thereof with said rim flange, said reinforcing flanges terminating a substantial distance radially inwardly from the terminals of said terminal end portions so that said terminal end portions are of substantially greater flexibility than the remaining portions of the fingers, said fingers being of sinuous radial cross-section and with the terminals being short and stiff and directed generally radially outwardly for retaining engagement with the radially inwardly facing rim flange, said sinuous section of the fingers affording a plurality of circumferentially extending reinforcing ribs projecting in alternate opposite axial directions and of circumferential curvature for additional stiffness.

References Cited in the file of this patent
UNITED STATES PATENTS

| 2,123,025 | Ramirez | July 5, 1938 |
| 2,133,597 | Tjaarda | Oct. 18, 1938 |
| 2,137,288 | Horn | Nov. 22, 1938 |
| 2,394,958 | Wood | Feb. 12, 1946 |
| 2,433,854 | Lyon | Jan. 6, 1948 |
| 2,618,513 | Horn | Nov. 18, 1952 |
| 2,683,631 | Lyon | July 13, 1954 |
| 2,690,357 | Lyon | Sept. 28, 1954 |
| 2,755,140 | Lyon | July 17, 1956 |
| 2,847,257 | Lyon | Aug. 12, 1958 |

FOREIGN PATENTS

| 524,139 | Canada | Apr. 24, 1956 |